United States Patent [19]
Jung

[11] Patent Number: 5,374,961
[45] Date of Patent: Dec. 20, 1994

[54] APPARATUS AND METHOD THEREFOR FOR PROVIDING THE LATEST INFORMATION IN RECEIVING TELETEXT

[75] Inventor: Tae H. Jung, Kwangmyong, Rep. of Korea

[73] Assignee: Samsung Electronics Co., Ltd., Kyungki-do, Rep. of Korea

[21] Appl. No.: 158,570

[22] Filed: Nov. 29, 1993

[51] Int. Cl.$^5$ ............................................. H04N 7/08
[52] U.S. Cl. ................................. 348/468; 348/569
[58] Field of Search ............... 348/468, 467, 464–466, 348/461, 569, 554, 570, 563, 564, 478, 463, 571, 705, 706, 720, 714–716, 725, 567, 565; H04N 7/087, 7/08, 5/44

[56] References Cited

U.S. PATENT DOCUMENTS

| | | | |
|---|---|---|---|
| 4,277,838 | 7/1981 | Chanders | 348/465 |
| 4,611,227 | 9/1986 | Brockhurst et al. | 348/468 |
| 4,633,297 | 12/1986 | Skerlos et al. | 348/569 |
| 4,991,017 | 2/1991 | Raaijmakers | 358/147 |
| 5,208,671 | 5/1993 | Tarrant | 348/468 |
| 5,237,411 | 8/1993 | Fink et al. | 348/468 |

FOREIGN PATENT DOCUMENTS

| | | | |
|---|---|---|---|
| 62-076987 | 4/1987 | Japan | H04N 7/08 |
| 1018380 | 1/1989 | Japan | H04N 7/08 |
| 1202992 | 8/1989 | Japan | H04N 7/08 |
| 3026187 | 2/1991 | Japan | H04N 7/08 |
| 3214983 | 9/1991 | Japan | H04N 7/08 |

*Primary Examiner*—James J. Groody
*Assistant Examiner*—Safet Metjahic
*Attorney, Agent, or Firm*—Sughrue, Mion, Zinn, Macpeak & Seas

[57] ABSTRACT

A teletext receiving apparatus for providing the latest information whereby only the latest information received when the information is irregularly changed includes a teletext decoder, first and second memories storing first data representative of old data and second data indicative of currently provided data and providing selected the first and second data, respectively, to a comparator for comparing the first data with the second data and a control signal generator for converting parallel data generated by the comparator into serial data, integrating the serial data to produce integrated data and limiting the integrated data with respect to a predetermined direct current level so as to provide a first control signal. In receiving the teletext, the previously received information is compared with new information and, if new information has been received, only the new information is displayed on a monitor. When new information is not received, i.e., when the latest information is identical to older information, one of a television mode or a video cassette recorder mode is provided.

15 Claims, 2 Drawing Sheets

APPARATUS AND METHOD THEREFOR FOR PROVIDING THE LATEST INFORMATION IN RECEIVING TELETEXT

FIELD OF THE INVENTION

The present invention relates to an apparatus for displaying teletext and, more specifically, to an apparatus for displaying the latest information received via teletext. In particular, when teletext, or any periodically updated information, is received, the new and previous information are compared and only the newly provided information is displayed, thereby excluding the older information from the screen. A method for operating the apparatus discussed above is also disclosed.

BACKGROUND OF THE INVENTION

Generally, an imaging apparatus such as color television or a video cassette recorder may include a built-in device for receiving teletext or other relevant information thereat. This allows persons either from home of from the office, to receive newly changed data information. In today's fast moving information age, if the desired information is selected, the full page containing the desired information is again displayed. In other words, the conventional apparatus for receiving teletext requires that the pages containing the desired information must be fully reproduced on a corresponding display, irrespective of the amount of data which has actually been changed. It will be noted that the transmitting end of the teletext system transmits the latest information but only selected portions of this information are changed and then only on an irregularly occurring basis. On the other hand, at the receiving end, all of the pages, i.e., complete pages containing both the changed and the unchanged portions of the information, are being displayed.

It will be appreciated from this discussion that there is a problem in the conventional apparatus in that the desired latest information is not easily watched, i.e., distinguished, because the previous information corresponding to unchanged information must be watched again.

U.S. Pat. No. 4,991,017, which is entitled "RECEIVER FOR TELEVISION AND TELETEXT SIGNALS, INCLUDING DECODER AND AN ADAPTIVE WAITING TIME REDUCTION CIRCUIT", discloses an apparatus for storing desired teletext page numbers in a page number memory and for retrieving teletext for the corresponding page numbers by a searching operation. The order of priority of these pages can be allocated to a page number of the memory, thereby reducing the waiting time. According to this patent, if the memory becomes full, the oldest requested page number is erased from the memory, thereby maintaining the latest page numbers active.

However, even in an apparatus constructed according to the above mentioned patent, when the user wants to receive information, the whole information corresponding to the stored page numbers must be displayed. Consequently, the user is unable to readily distinguish between old and new teletext information.

SUMMARY OF THE INVENTION

The principal object of the present invention is to provide an apparatus for generating the latest information received as teletext.

Another object of the present invention is to provide circuitry in which, previously received information is compared with newer information, and only the newer information is displayed on a monitor. According to one aspect of the invention, when newer information is not input, the circuit permits operation in a television mode or a video cassette recorder mode, so that the latest information and pictures output from the color television or the video cassette recorder can be alternatively and effectively viewed.

These and other objects, features and advantages of the present invention are provided by an apparatus for generating the latest information in receiving teletext, for use in a video cassette recorder or a color television having a decoder for processing character information, wherein an analog signal corresponding to character information is separated from a composite video signal received from an external source to be displayed on a monitor. The apparatus includes:

an analog/digital convertor receiving an analog signal corresponding to character information provided from the decoder and producing a digital signal;

a first memory and a second memory storing first data representative of old data and second data indicative of currently provided data based on the digital signal and providing selected first data and second data, respectively, responsive to a predetermined control signal;

a comparator comparing the first data with the second data;

a control signal generator converting parallel data generated by the comparator into serial data, integrating the serial data to produce integrated data and limiting the integrated data with respect to a predetermined direct current level so as to provide a first control signal;

a digital/analog convertor receiving only the latest of the second data stored in the second memory generating a latest analog signal when the first control signal represents a difference between the first data and the second data;

a controller responsive to a predetermined key signal for generating a signal for controlling the decoder, the first memory and the second memory, a time for the latest information, an executing signal and a character information ON/OFF signal;

an variable address generator for sequentially increasing an address signal of the first memory and the second memory when the first control signal indicates coincidence between the first data and the second data;

a first logical combination circuit controlling a first switch, the first switch selectively providing an output from the digital/analog convertor and an output from one of character information and television/video responsive to logically combining the first control signal with the executing signal; and a second logical combination circuit for controlling a second switch which switch selectively provides one of the character information and the television/video signal to one terminal of the first switch responsive to logically combining an inverted output of the first logical combination circuit and the character information ON/OFF signal.

These and other objects, features and advantages of the invention are disclosed in or apparent from the following description of preferred embodiments.

BRIEF DESCRIPTION OF THE DRAWINGS

These and other objects, features, and advantages of the present invention will become more apparent from the following description of the preferred embodiment taken in conjunction with the accompanying drawings, in which.

DETAILED DESCRIPTION OF THE INVENTION

Figure 1:
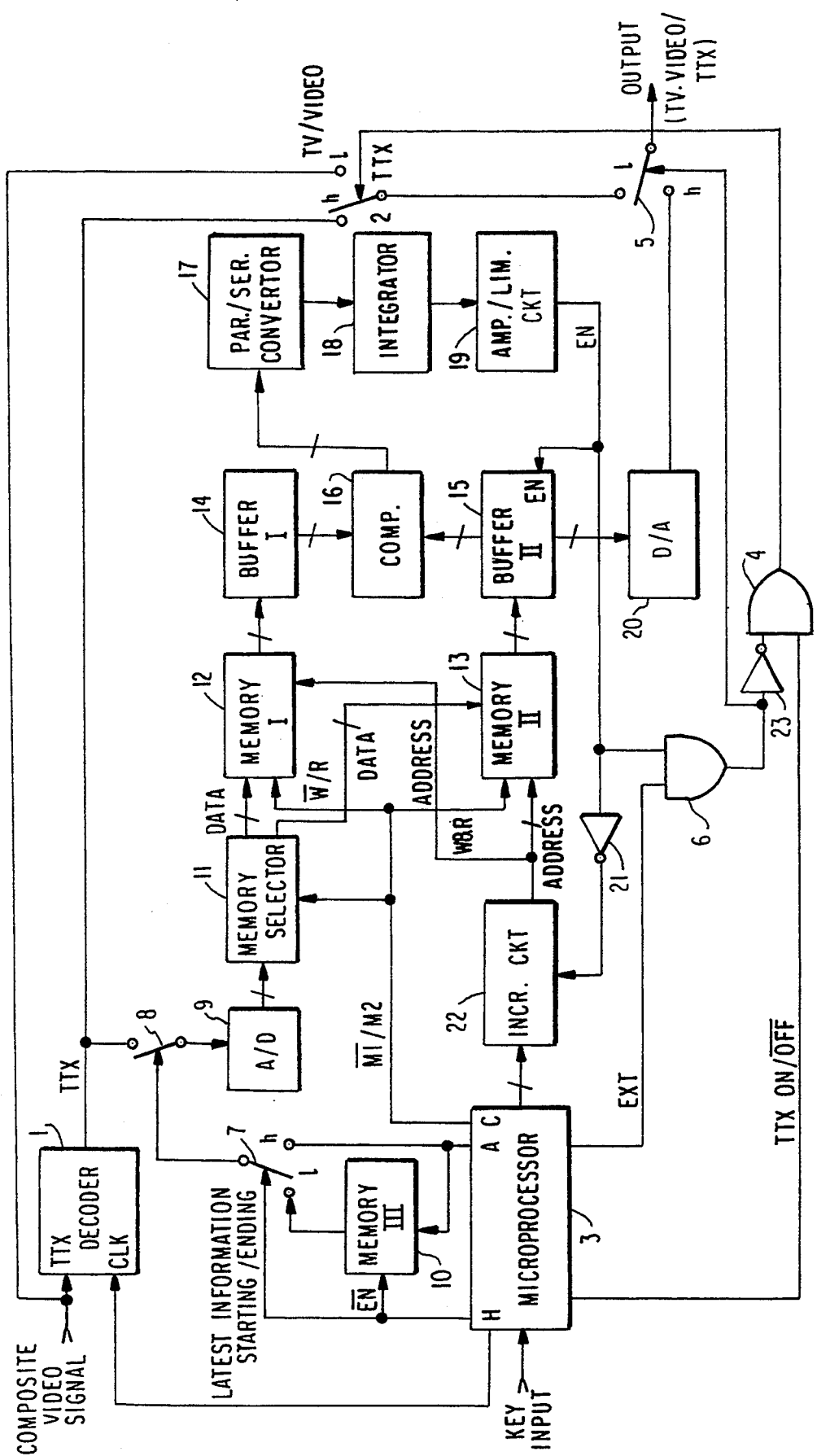
FIG. 1 is a block diagram of the apparatus for providing the latest information in receiving teletext according to the present invention.

FIG. 1 shows an apparatus for providing the latest information in receiving teletext. The apparatus of FIG. 1 includes a decoder 1 for processing character information, an analog/digital converter 9 for converting, into a digital signal, an analog signal for character information provided from the decoder 1. It will be noted that only the analog signal which signal is added to the composite video signal, is separated from a composite video signal received from an external source.

A memory selector 11 is coupled to an output terminal of the analog/digital converter 9 for selectively providing, a digital signal representing the digitally converted signal supplied to a first memory 12 and a second memory 13, each of which is switched, in accordance with a predetermined control signal M1/M2.

The first memory 12 normally stores and outputs a predetermined amount of the digitally converted signal. The first memory 12 outputs first data corresponding to old information. The second memory 13 outputs second data corresponding to the currently input information.

An output terminal of the first memory 12 is coupled to an input terminal of a comparator 16 via a first buffer 14, while an output terminal of the second memory 13 is connected to another input terminal of the comparator 16 via a second buffer 15. The comparator 16 advantageously can be of an exclusive OR gate, which compares the first data, i.e., old information, provided from the first memory 12 with the second data, i.e., current information, provided from the second memory 13, so that, if they are not identical, the comparator 16 gate outputs a signal having a high level.

A parallel/serial converter 17 for converting a compared parallel data signal into a serial data signal is coupled to an output terminal of the comparator 16. An integrator 18 for integrating the serial data is coupled to an output terminal of the parallel/serial converter 17. An amplifying and limiting circuit 19 for amplifying the integrated signal and limiting the amplified signal to a constant DC level is coupled to an output terminal of the integrator 18.

A second output terminal of the second buffer 15 is connected to a digital/analog converter 20, which converts the latest information data stored in the second buffer 15 into an analog signal when the first data is not coincident with the second data in response to an enable signal EN provided by the amplifying and limiting circuit 19.

A control circuit generates, upon receipt of a predetermined signal, a decoder signal for controlling the decoder 1, a memory control signal M1/M2, a time control signal for the latest information, an address signal, an executing signal, and character information ON/OFF signal, TTX ON/OFF. The control circuit comprises a microprocessor 3 for providing the above-described control signals in response to operation of an external key, a third memory 10 for memorizing a searching time for the latest information, a third switch 7, which is operated during the searching time for the latest information under the control of the microprocessor 3, and a fourth switch 8, operated by a signal passed through the third switch 7 for routing the output from decoder 1 to analog/digital converter 9.

An incrementing circuit 22 is switched using an output terminal of the microprocessor 3 of the control circuit, which permits continuous examination of the coincidence between the first data and the second data by sequentially increasing the address signal generated from the microprocessor 3 in accordance with the first control signal provided from the amplifying and limiting circuit 19, i.e., when the first data and the second data are identical to each other.

The first and second memories 12 and 13 are coupled to the output terminal of the incrementing circuit 22 in order to provide a varied address.

An AND gate 6, of which one input terminal is coupled to the output terminal of the amplifying and limiting circuit 19, while the other input terminal is coupled to receive executing signal EXT from the microprocessor 3, logically combines the first control signal and the executing signal when searching for the latest information, and controls a first switch 5 for selectively switching between (a) the output terminal of the digital/analog converter 20 and (b) the output terminal of a television/video switch 2 in order to display character information or a video signal on the monitor (not shown).

An AND gate 4, to which one input terminal is coupled to the output terminal of the AND gate 6 via an inverter 23 while the other input terminal is coupled to receive the ON/OFF signal terminal TTX ON/OFF, logically combines the output of the inverted output of AND gate 6 and the TTX ON/OFF signal and controls switch 2 to selectively output the television/video signal or character information TTX.

Switches 5 and 2, which are respectively controlled by AND gates 6 and 4, are operated to output a video signal, e.g., a television signal, when current information is identical to old information. When current information is not coincident with old information, AND gates 6 and 4 cooperate to select the output of the digital/analog converter 20.

Figure 2:
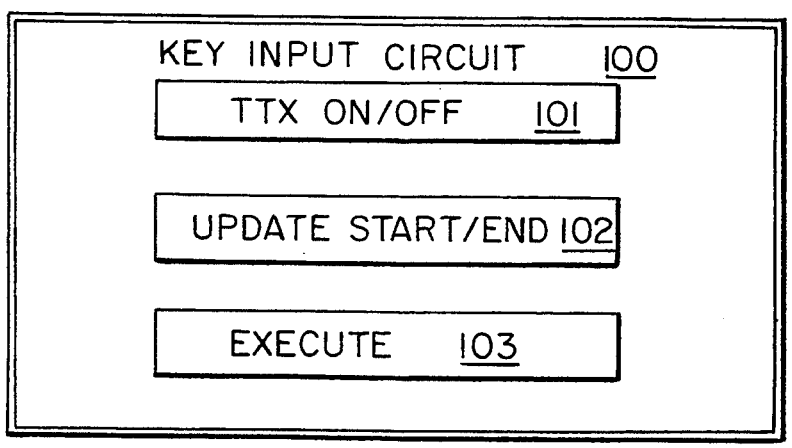
FIG. 2 is a key input circuit for providing control signals to the circuitry shown in FIG. 1.

The above-described operation of an apparatus for providing the latest information in receiving teletext according to the present invention will now be explained in detail below while referring to FIGS. 1-3. It will be noted that the object of the present invention is to select and display only updated information from the teletext data on screen while a desired page is selected from a number of information pages on screen. This page may be selected using the address without watching the screen. However, since the user generally does not memorize the respective page numbers, the user must then select the desired pages on screen.

In an exemplary case where the updated information for pages 10 through 20 of a total 100 pages is of interest to the user, a START key for the updated information is pressed at page 10 and an end key is pressed at page 20. Preferably, these keys may be combined to form a toggle switch.

Figure 3:
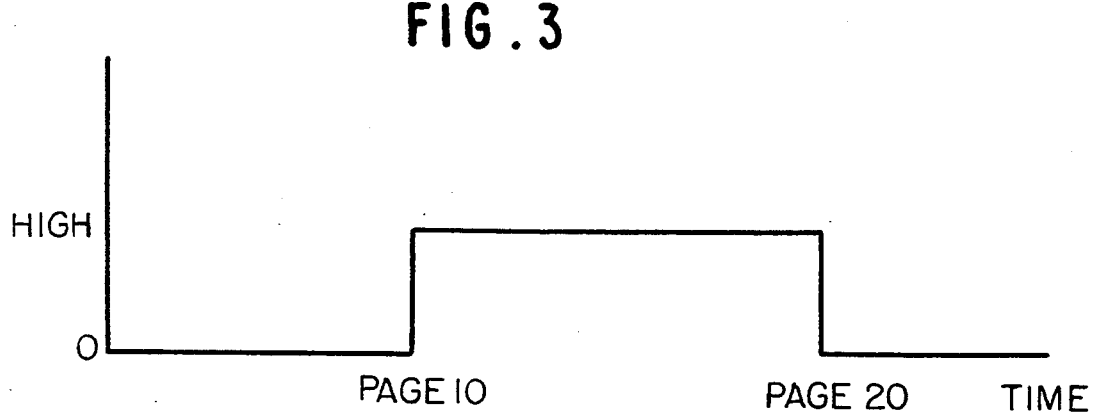
FIG. 3 is a high level timing chart which is useful in explaining operation of various components illustrated in FIG. 1.

FIG. 3 shows a timing chart for microprocessor 3 and an output signal from terminal B of the microprocessor 3. The switch 7 is connected to a high terminal h during the period when the output of terminal B is at a high level. Memory 10, which receives the output of terminal B of microprocessor 3 as signal $\overline{EN}$, is enabled to write for this period and memorizes the updated timing information during This time. Thus, when the $\overline{EN}$ signal applied to memory 10 is high, the memory 10 is enabled to write. If the signal is low, memory 10 shifts to the read mode of operation.

Thereafter, when the EXECUTE key 103 is pressed to display the updated information, the output of the terminal B of the microprocessor 3 goes low and the memory 10 is enabled to read, so that the switch 7 is connected to the low terminal "l". The updated time information of the memory 10 is read and output to the control terminal of the switch 8 via the switch 7. Once the EXECUTE key 103 is pressed, decoder 1 initially resets the page and the signal for the period where an updated timing signal is high is input to A/D converter 9. Thus, the desired page information is input to the A/D converter 9.

The circuitry shown in FIG. 1 is readily operable by using three keys including a TTX ON/OFF key 101, an UPDATE START/END key 102 and an EXECUTE key 103.

Preferably, TTX ON/OFF key 101 provides a toggle operation. When key 101 is operated to indicate the ON condition, a TTX signal (inclusive of the updated signal) and the general video signal are output. When key 101 indicates the OFF condition, either an updated signal or a TTX signal is output by the gate operation as shown with respect to FIG. 3. UPDATE START/END key 102 advantageously can provide another toggle operation, wherein the signal output from terminal B of microprocessor 3 is output. Operation of EXECUTE key 103 permits the updated information to be output if the desired updated information exists. A more detailed description follows.

An operating mode for receiving character information is initiated in response to the TTX ON/OFF key 101 of a key input circuit 100. Thereafter, microprocessor 3 provides a character information ON/OFF signal TTX ON/OFF at a high level. Accordingly, a signal having a high level is input to one input terminal of the AND gate 4.

The other input terminal of the AND gate 4 receives an inverted output signal of the AND gate 6. In this respect, if the EXECUTE key 103 is not pressed down, the output EXT of the microprocessor 3 is a low level signal. Therefore the output of AND gate 6 is also a low level, which low level signal then is applied to the input of AND gate 4 as a high level signal via inverter 23. The AND gate 4 outputs a high-level signal for controlling the second switch 2 to the terminal labelled "h". Since the output of AND gate 6a is low level signal, the first switch 5 is positioned to the terminal "l".

Furthermore, when the second switch 2 is switched to the terminal "h" and the first switch 5 is switched to the terminal "l", the received composite video signal is decoded in the decoder 1 and is then displayed on the monitor (not shown) via the terminal "h" of the switch 2 and the terminal "l" of the switch 5, thus allowing the user to view the teletext.

Moreover, a mode for memorizing teletext, can be selected using the UPDATE START/END key 102 located in the key input circuit 100 for starting and ending the latest information. The microprocessor 3 outputs a signal having a high level for the latest information receiving time via the control terminal "A", and at the same time, generates a signal for operating the switch 7 via a control terminal "B".

When the switch 7 is coupled to the terminal "h", a switch 8 is turned on by the signal passed through switch 7. At this time, data for the latest information receiving time is memorized in third memory 10, as discussed in detail above.

When the third memory 10 is turned ON, a composite analog signal for character information separated from the decoder 1 is input to the analog/digital converter 9 via the switch 8 and is then converted into a digital signal. In the microprocessor 3, control signal M1/M2 having a low level is generated and applied to the memory selector 11 and the first and the second memories 12 and 13 via control terminal "C". The memory selector 11 is thus switched to provide the first memory 12 with a digitally converted data. In other words, the first memory 12 is operated upon receipt of the control signal M1/M2 provided from the microprocessor 3. When the control signal M1/M2 is a low-level signal, it is provided to the first memory 12 as a write signal W/R. Thus, a digital signal which is output from analog/digital converter 9 via the memory selector 11 is written into the first memory 12.

Switches 5 and 2 are maintained in the position described above, so that the character information is displayed on the monitor.

When an operating mode for comparing the coincidence between old information and current information is desired, the EXECUTE key of key 103 of input circuit 100 is pressed down by the user. Then, the microprocessor 3 generates the executing control signal EXT as a high level signal and provides that signal to one input terminal of AND gate 6, while also providing the character information ON/OFF signal TTX ON/OFF as a low level signal to one input terminal of AND gate 4.

The AND gate 4, then, outputs a low-level signal to move switch 2 to the terminal "l" position. Switch 5 is positioned to terminal "l" or to terminal "h" in accordance with an output level of AND gate 6 to thereby select a signal passed through switch 2 or an output of the digital/analog converter 20.

In this mode, a high-level control signal M1/M2 is generated at the control terminal "C" of the microprocessor 3. Accordingly, the memory selector 11 is repositioned in order to provide second memory 13 with an output of the analog/digital converter 9. First memory 12 is operated in the reading mode of operation in response to the control signal M1/M2. Therefore, the first memory 12 reads out old data and applies it to the comparator 16 via the first buffer 14. Meanwhile, second memory 13 applies a digital signal provided from the memory selector 11, i.e., the latest information, to the comparator 16 via the second buffer 15.

As discussed above, the comparator 16, including the exclusive OR gate, outputs a low-level signal if signals provided from the first and the second buffers 14 and 15 are identical to each other while, if they are not identical, the comparator 16 generates a signal having a high level.

For instance, when output data of the first memory 12 is "10110011" and that of the second memory 13 is "01101000", an output of the comparator 16 is "11011011". In this respect, "1" signifies the existence of the latest information, while "0" signifies the absence of the latest information.

Parallel data provided from the comparator 16 is converted into a serial data by the parallel/serial converter 17 and is integrated at the integrator 18. The output of the integrator 18 is a low level if the outputs of the comparator 16 are all "0", while, if the output of the comparator 16 is changed from high level to low level or vice versa, integrator 18 generates a predetermined analog waveform.

The amplifying and limiting circuit 19 amplifies the output of the integrator 18 and limits it to a constant direct current voltage. When there are differences between the first and the second memories 12 and 13, the amplifying and limiting circuit 19 outputs a high level signal.

If the output of the amplifying and limiting circuit 19 is a high level signal, the enable terminal EN of the second buffer 15 receives this high level signal, so that only the latest information temporarily stored into the second buffer 15 is input to the digital/analog converter 20 and output as an analog signal.

The signal having a high level generated from the amplifying and limiting circuit 19 is applied to one input terminal of AND gate 6. At this time, executing signal EXT having a high level and provided from the microprocessor 3 is applied to the other input terminal of the AND gate 6, so that the output signal of the AND gate 6 becomes high level and switch 5 is switched to the terminal "h" position. Therefore, the analog signal for the latest information converted at the digital/analog converter 20 is displayed on the monitor by way of the terminal "h" of switch 5.

However, if the contents of the first and the second memories 12 and 13 are identical to each other, the output of the comparator 16 becomes a low level signal. The second buffer 15 is disabled by the amplifying and limiting circuit 19, so that there is no signal output from the digital/analog converter 20 in existence. At the same time, the output of the AND gate 6 becomes low level, so that the first switch 5 switched to the terminal "I". Accordingly, a television or video signal is displayed on the monitor. As a result, if the currently provided information is identical to the old information, the user can view the television broadcast or the video signal during this time (e.g., when there is no change in the received information).

As mentioned above, in respect with the apparatus for providing the latest information in receiving teletext according to the present invention, upon receipt of the latest information, if they are not identical to the old information, the changed latest information can be viewed, whereas, if it is the same, the television broadcast or the video signal reproduced from a tape can be viewed, so that the user can effectively view the teletext without being bored.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An apparatus for providing the latest teletext information for use in one of a video cassette recorder and a color television having a decoder for processing character information, wherein an analog signal for character information is separated from a composite video signal received from an external source for display on a monitor said apparatus comprising:

analog/digital converting means for converting an analog signal for character information provided from said decoder for processing character information into a digital signal;

memorizing means for storing first data representative of old data and second data indicative of currently provided data, respectively, and for providing said first and second data according to a predetermined control signal;

comparing means for comparing the first data with the second data to determine whether or not the first data and the second data are identical to each other, each data being provided from said memorizing means, respectively;

control signal generating means for converting parallel data corresponding to output of said comparing means into a serial data, for integrating said parallel data to produce integrated data and then amplifying and limiting said integrated data with respect to a predetermined direct current level, to thereby output a first control signal;

digital/analog converting means for converting only the latest information data stored in a second memory of said memorizing means into an analog signal when the first control signal of said control signal generating means represents a difference between the first data and the second data;

control means for, upon receipt of a predetermined key signal, generating at least one of a decoder signal for controlling said decoder, a memory signal for controlling said information memorizing means, a timing signal for controlling a time for the latest information, an executing signal and a character information ON/OFF signal;

address variable means for sequentially increasing an address signal of said memorizing means if the first control signal of said first control signal generating means represents coincidence between the first data and the second data;

first logical combination means for controlling a first switch which selectively provides one of an output of said digital/analog converting means and an output of character information and television/video by logically combining the first control signal of said first control signal generating means with the executing signal of said control means; and second logical combination means for controlling a second switch which selectively provides one of the character information and the television/video signal to one terminal of said first switch by logically combining an inverted output of said first logical combination means and the character information ON/OFF signal of said control means.

2. The apparatus according to claim 1, wherein said memorizing means comprises:

a first memory storing old data;

a second memory storing the latest information; and a memory selector for selectively coupling an output terminal of said analog/digital converting means to said first memory in response to the memory signal when a timing key signal for setting a time interval for the latest data is input to said control means, and for coupling the output terminal of said analog/digital converting means to the second memory when an executing key signal for extracting only the latest information of the same time interval is received after terminating input of said timing key signal to said control means.

3. The apparatus according to claim 2, wherein said comparing means comprises:
a first buffer for temporarily storing an output of said first memory when an UPDATE key signal is input to said control means;
a second buffer for temporarily storing an output of said second memory when said UPDATE key signal is input to said control means; and
an exclusive OR gate for logically combining an output of said first buffer with an output of said second buffer to generate a digital signal.

4. The apparatus according to claim 1, wherein said first control signal generating means comprises:
a parallel/serial converter for converting said parallel data provided from said comparing means into a serial data;
an integrator for integrating the serial data converted at said parallel/serial converter; and
an amplifying and limiting circuit for amplifying the output of said integrator, and limiting an output of said integrator with respect to a predetermined DC level so as to generate said first control signal.

5. The apparatus according to claim 1, wherein said control means comprises:
a microprocessor for providing said at least one control signal in response to a received external key signal;
a third memory for memorizing a searching time for the latest information;
a third switch operated during said searching time for the latest information under control of said microprocessor; and
a fourth switch for coupling an output of said decoder to said analog/digital converting means in response to control of said third switch during said searching time for the latest information.

6. The apparatus according to claim 1, wherein said first and second switches controlled by said first and second logical combination means are operated to output one of a television and video signal when the latest information is identical to the old information and to select an output of said digital/analog converting means in order to output only the latest information when the latest information is not identical to the old information.

7. The apparatus according to claim 1, wherein said comparing means comprises:
a first buffer for temporarily storing an output of said first memory when an UPDATE key signal is input to said control means;
a second buffer for temporarily storing an output of said second memory when said UPDATE key signal is input to said control means; and
an exclusive OR gate for logically combining an output of said first buffer with an output of said second buffer and generating a digital signal.

8. An apparatus for providing the latest information in receiving teletext, for use in one of a video cassette recorder and a color television and having a decoder for processing character information, wherein an analog signal for character information is only separated from a composite video signal received from an external source to be displayed on a monitor, comprising:
an analog/digital convertor receiving an analog signal corresponding to character information provided from said decoder and producing a digital signal;
a first memory and a second memory storing first data representative of old data and second data indicative of currently provided data based on said digital signal and providing selected said first data and said second data, respectively, responsive to a predetermined control signal;
a comparator comparing said first data with said second data;
a control signal generator receiving parallel data generated by said comparator, producing integrated data and limiting said integrated data with respect to a constant voltage, thereby providing a first control signal;
a digital/analog convertor receiving only said latest of said second data stored in said second memory and generating a latest analog signal when said first control signal represents a difference between said first data and said second data;
a controller responsive to a predetermined key signal for generating a decoder signal for controlling said decoder, a memory signal for controlling said first memory and said second memory, a timing signal for controlling a time for said latest information, an executing signal and a character information ON/OFF signal;
an variable address generator for sequentially increasing an address signal of said first memory and said second memory when said first control signal indicates coincidence between said first data and said second data;
a first logical combination circuit controlling a first switch, said first switch selectively providing an output from said digital/analog convertor and an output from one of character information and television/video responsive to logically combining said first control signal with said executing signal; and
a second logical combination circuit for controlling a second switch which switch selectively provides one of said character information and said television/video signal to one terminal of said first switch responsive to logically combining an inverted output of said first logical combination circuit and said character information ON/OFF signal.

9. The apparatus according to claim 8, further comprising a memory selector for selectively connecting an output terminal of said analog/digital convertor to said first memory in response to the control signal when a timing signal for setting a time interval for the latest data is input to said controller and the output terminal of said analog/digital convertor to the second memory when an executing key signal for extracting only the latest information of the same time interval after terminating the input of a desired time interval is input to said controller.

10. The apparatus according to claim 9, wherein said comparator comprises:
a first buffer for temporarily storing an output of said first memory when a selected UPDATE key signal is input to said controller;

a second buffer for temporarily storing an output of said second memory when said UPDATE key signal is input to said controller; and an exclusive OR gate for logically combining an output of said first buffer with an output of said second buffer to generate a digital signal.

11. The apparatus according to claim 8, wherein said control signal generator comprises:

a parallel/serial converter for converting said parallel data provided from said comparator into serial data;

an integrator for integrating the serial data to produce said integrated data; and an amplifying and limiting circuit for amplifying and limiting the integrated data with respect to a predetermined DC level.

12. The apparatus according to claim 8, wherein said controller comprises:

a microprocessor;

a third memory;

a third switch operated under control of said microprocessor; and a fourth switch for coupling an output of said decoder to said analog/digital convertor in response to said third switch during the searching time for the latest information.

13. The apparatus according to claim 8, wherein said first and second switches controlled by said first and second logical combination circuits are operated to select one of an output of a television and video signal when the latest information is identical to the old information and an output of said digital/analog converting means so as to output only the latest information when the latest information is not identical to the old information.

14. The apparatus according to claim 8, wherein said comparator means comprises:

a first buffer storing an output of said first memory;

a second buffer storing an output of said second memory; and an exclusive OR gate for logically combining an output of said first buffer with an output of said second buffer to generate said digital signal.

15. A method for operating a teletext receiving apparatus provided in one of a video cassette recorder and a color television and having a decoder, an analog/digital convertor receiving an analog signal corresponding to character information provided from said decoder and producing a digital signal, a first memory and a second memory storing first data representative of old data and second data indicative of currently provided data based on said digital signal and providing selected said first data and said second data, respectively, responsive to a predetermined control signal, a comparator for comparing said first data with said second data provided from said first memory and said second memory, respectively, and a digital/analog convertor receiving only said latest of said second data stored in said second memory and generating a latest analog signal, said method comprising the steps of:

storing the first data and the second data during a first period of time and a second period of time, respectively;

comparing said first data with said second data; and displaying a portion of said second data which is different from a corresponding portion of said first data.

* * * * *